No. 643,615. Patented Feb. 13, 1900.
J. A. NICKERSON.
NUT LOCK.
(Application filed Dec. 19, 1899.)

(No Model.)

Witnesses
Louis G. Barrett.
Edward H. Hopson.

Inventor
Joseph A. Nickerson.
By William Holiday,
Attorney.

UNITED STATES PATENT OFFICE.

JOSEPH A. NICKERSON, OF BOSTON, MASSACHUSETTS.

NUT-LOCK.

SPECIFICATION forming part of Letters Patent No. 643,615, dated February 13, 1900.

Application filed December 19, 1899. Serial No. 740,920. (No model.)

*To all whom it may concern:*

Be it known that I, JOSEPH A. NICKERSON, of Boston, (Roxbury,) in the county of Suffolk, State of Massachusetts, have invented certain new and efficient Improvements in Nut-Locks, of which the following is a specification.

This invention relates to nut-locks; and it has for its object to attain an association of its parts, so that when the parts are located in their respective engagement with each other the same will remain as positioned in an efficient manner until disengaged by hand, which I attain in the following manner—that is to say, when the nut-lock is in use.

Figure 1:
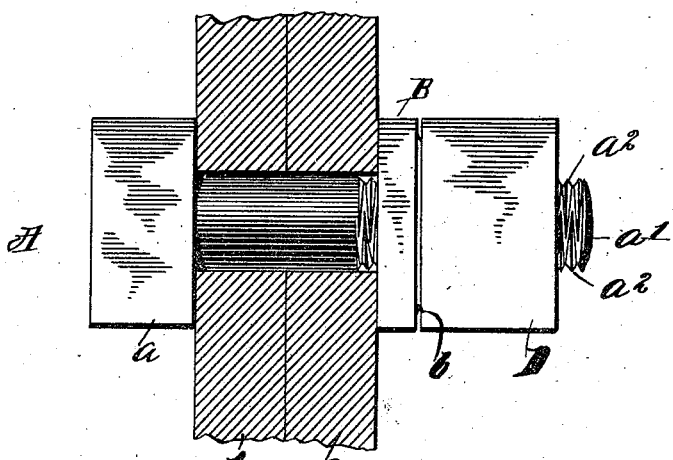
Figure 2:
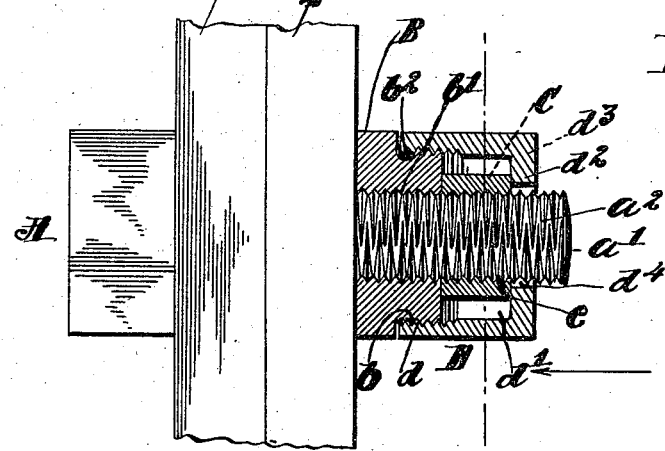
Figure 3:
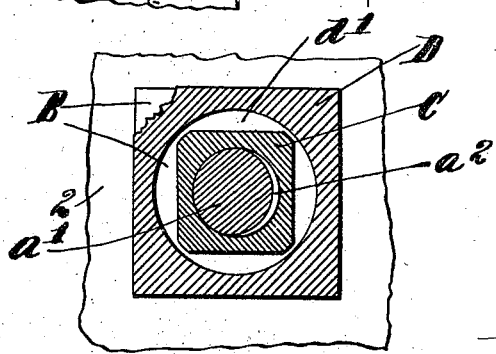

Figure 1 is a side view of my invention. Fig. 2 is a longitudinal section. Fig. 3 is a transverse section of Fig. 2, looking in the direction denoted by the arrow.

A represents the bolt, $a$ its head, and $a'$ its shank or stem. The free end of the bolt-stem for a distance of its length is threaded with a right-hand thread and with a left-hand thread on the same part of the stem, as denoted by the letter $a^2$, so as to permit a right-hand-threaded nut to be screwed on the bolt-stem and also a left-hand threaded nut to be screwed on said stem.

B denotes a right-hand-threaded nut, the threads of which efficiently mesh with the corresponding threads on the bolt-stem. The longitudinal outer surface of this nut is provided with right-hand threads, (represented by $b$.) $b'$ denotes the internal threads of said nut.

C represents a check-nut which is provided with left-handed threads (denoted by the letter $c$) that engage corresponding threads on the bolt-stem.

D denotes a binding cap-nut which is provided with internal right-handed threads (represented by the letter $d$) that engage with the corresponding external threads provided on the right-hand-threaded nut. This cap-nut is provided with the internal space $d'$, the diameter of which is greater than the outside points of the check-nut, (clearly illustrated in Fig. 3,) and is also provided with the shoulder $d^2$, the function of which is to contact the outer vertical surface of the check-nut, as shown in Fig. 2. The head of the cap-nut $d^3$ has the opening $d^4$ therethrough, the diameter of which is greater than that of the threaded bolt-stem, the purpose of which is to prevent the cap-nut contacting the bolt-stem.

1 and 2 represent material through which the bolt is passed and is illustrated as being rigidly held together by the bolt and its several nut parts just described.

The following is a description of the peculiarities and attainments of this invention: As is well known in mechanics, it is desirable in certain constructional work to use a bolt and nut to draw firmly and rigidly together iron plates and the like and to hold them together as set by the bolt and nut, and at the same time to have the bolt and nut so engaging each other that the bolt or nut through vibration will not allow the plates held by the bolt and nut to become loose. To accomplish this end, various means and devices have been employed, particular attention being given to lock the nut contacting the plate in the position set.

This invention accomplishes two essential mechanical locking elements in a nut-lock and bolt among other elements, which will be hereinafter pointed out—namely, that the material or plate contacting nut is efficiently locked, and also the bolt is locked in such a manner that it cannot be even turned by hand or otherwise.

The bolt is passed through the plates. The right-hand-threaded nut is screwed on the stem and brought home hard against the face of the plate, bringing both plates firmly together. The left-hand-threaded nut is then screwed on the bolt-stem and brought home hard against the first-positioned nut. This association of the right and left hand threaded nuts on the bolt-stem attains the following locking element, namely:

The turning of the right-handed nut in the direction capable of becoming loose is checked by the left-handed nut, that is made to turn, due to both nuts being up hard against each other, in the direction drawing said nut farther on the bolt-stem, and consequently harder against the right-hand-threaded nut; but there is nothing so far to prevent the bolt turning or the left-hand-threaded nut working free. These two points or defects are overcome by the cap-nut, which, after the aforesaid nuts have been positioned, as before described, is screwed on the plate-contacting nut which has right-handed threads, thus requiring the cap-nut to be screwed on the nut in a right-handed direction until it is brought home hard against the outer vertical surface of the check-nut or left-handed nut. This cap-nut prevents any possible movement of the check-nut. The movement to free itself would have to be in a right-handed direction, which would increase the force against the cap-shoulder and tend to draw the cap-nut farther on the plate-contacting nut, thus increasing the locking element. Further, this cap-nut prevents the bolt turning by staying any movement of the check-nut. In other words, the same force that would tend to free the bolt and nut parts would at the same time establish a greater locking force of the said parts. To insure against any possible freeing of the cap-nut from its engaging nut, the end of the cap-nut may be slightly squatted on the said engaging nut, so as to fill a small cavity or groove provided on the engaging nut, (represented by $b^2$.)

When removing the cap-nut, the threads thereon will resume or be forced back to their original form.

I wish it to be understood that I am aware that a bolt having right and left handed threads thereon, as described in this application, and right and left handed nuts designed to engage said bolt and each other have been heretofore used to attain the end sought by this invention and that I do not claim the same broadly; but What I do claim as my invention, and desire to secure by Letters Patent, is—

The combination of a bolt having right and left crossing threads on its stem, a nut having right-hand threads to engage corresponding threads on the bolt-stem, and having right-hand threads on its outer surface to engage a cap-nut, a check-nut having left-hand threads to engage corresponding threads on the bolt-stem, a cap-nut having threads to engage the external threads on the right-hand-threaded nut, and having a shoulder to engage the outer vertical side of the check-nut, and an opening therethrough in diameter greater than the diameter of the bolt-stem, and being designed to not contact the check-nut other than the vertical wall of said check-nut before mentioned, substantially as described.

In testimony whereof I have hereunto set my hand to this application this 15th day of December, A. D. 1899.

JOSEPH A. NICKERSON.

Witnesses:
   THOS. WILLIAM HOBDAY,
   EDWARD F. HOLLIS.